United States Patent [19]

Tarbox et al.

[11] 3,742,987

[45] July 3, 1973

[54] PIN ALIGNMENT APPARATUS

[75] Inventors: John W. Tarbox, Malibu; Wilfried Zimmermann, Los Angeles, both of Calif.

[73] Assignee: Hughes Aircraft Company, Culver City, Calif.

[22] Filed: May 28, 1970

[21] Appl. No.: 41,438

[52] U.S. Cl. ................ 140/147, 29/630 A, 140/149, 72/DIG. 10

[51] Int. Cl. ................ B21f 7/00

[58] Field of Search ................ 140/147, 149; 72/112, DIG. 10; 29/630 R, 630 A

[56] References Cited

UNITED STATES PATENTS

| | | | |
|---|---|---|---|
| 3,580,297 | 5/1971 | Spadoni | 140/149 |
| 3,524,482 | 8/1970 | Church et al. | 140/149 |
| 2,609,858 | 9/1952 | Engel | 72/DIG. 10 |
| 3,349,813 | 10/1967 | Pastuszak | 140/147 |
| 2,869,129 | 1/1959 | Rogers | 72/DIG. 10 |
| 2,971,555 | 2/1961 | Paulson | 72/125 |
| 2,654,403 | 10/1953 | Roe | 140/119 |
| 3,603,357 | 9/1971 | Drummond | 140/147 |

*Primary Examiner*—Charles W. Lanham
*Assistant Examiner*—M. J. Keenan
*Attorney*—James K. Haskell and Richard J. Rengel

[57] ABSTRACT

Pin alignment heads are sequentially positioned over groups of terminal pins disposed in arrays on panel boards to produce a uniform alignment of the pins by axial twisting thereof. At each of the positions, a group of pin sockets, individual to each head, are coaxially disposed over corresponding terminal pins of the selected group and seated on the pin ends. Upon seating, the pin sockets are rotated to twist the terminal pins beyond their elastic limit whereby the terminal pins retain a desired alignment induced by the pin sockets.

20 Claims, 9 Drawing Figures

INVENTORS.
JOHN W. TARBOX,
WILFRIED ZIMMERMANN,
BY
Richard J. [signature]
ATTORNEY.

PIN ALIGNMENT APPARATUS

BACKGROUND OF THE INVENTION

At the present time, a substantial amount of electronic equipment is being assembled automatically on circuit panel boards, each board having a set of terminal strips including rows of terminal pins projecting out of the back side of the board and disposed to be connected to printed circuit boards mounted on the front side of the panel. The terminal pins are interconnected by programmed, automatic wiring machines which provide circuit interconnections by selectively laying wire between pins and wrapping wire around individual pins. In this manner, power supply distribution and other interconnections provide the desired circuit arrangements for electronic equipment.

Extensive use of automatic wiring machines and circuit panel boards has come about in the past decade because of the improved efficiency and accuracy of these machines over other methods of making extensive wiring interconnections required for complicated electronic equipment. However, persistent difficulty does remain in that the wiring machines are dependent upon the terminal pins of the panel board arrays being accurately aligned in order to wrap the wire around the pins at individual locations to complete the programmed wiring pattern. Accordingly, misaligned terminal pins, in an array of hundreds or thousands of pins, are often present and, in many instances, will stop the machine or produce a deviation in the programmed circuitry by failure to wrap wire around the misaligned terminal pins. In any event, delay of the machine and expense of finding and correcting the condition can be overcome by providing for pin alignment processing of the panel boards to assure terminal pin alignment prior to wiring thereof by the automatic wiring machines.

Accordingly, the present invention is directed to improved pin alignment apparatus for processing arrays of terminal pins on panel boards for electrical or electronic equipment.

SUMMARY OF THE INVENTION

The pin alignment apparatus of the present invention comprises a plurality of alignment heads adapted to be positioned to provide precise, uniform alignment of arrays of terminal pins in panel boards by a numerical programmed system for machine tool control wherein point-to-point direction control of X–Y movements of a machine table or tool spindle is provided for positioning of the alignment heads to desired locations for concurrent alignment of individual groups of pins in the arrays. Preferably, an X–Y positioning machine is controlled to move the alignment heads along respective rows of pins of the array in small increments and remaining at each position until the alignment heads complete an operations cycle. A suitable control system for positioning the alignment heads of the present invention is disclosed in U.S. Pat. No. 3,252,147 of E. J. Toscano, for example.

An individual pin alignment head comprises a group or grouping of pin sockets, each socket having an internal bore conforming to the shape of the terminal pins, e.g. square pins. During the seating phase, movement of one or more of the sockets of the alignment head along the longitudinal axes of the respective pins seats the end portions thereof within the sockets for coaxial alignment of the pins in the group. An opening taper or flared end of the pin sockets provides for receiving and deflecting any misaligned terminal pins to seat the pin end portions in the internal bores of the pin sockets. Further, the individual pin sockets are resiliently supported to provide for axial movement thereof against a spring bias applied thereto whereby damage to pins during seating is avoided while providing for lateral deflection of pins by the tapered end to guide the pins into the internal bores of the pin sockets to seat therein. Upon rotation of the pin sockets of the group, any circumferentially misaligned terminal pins are seated and axial deflection of the sockets permits this deferred seating until rotational alignment of the pin sockets therewith, as described in greater detail hereinafter.

The rotation of the sockets of the pin alignment heads produces axial twisting of the terminal pins of the group beyond their elastic limit in order that the pins permanently retain the axial alignment induced by the pin sockets, after retraction thereof. Retraction of the alignment head, after alignment of each pin group, is facilitated by freeing the pin sockets from frictional engagement with the pins, due to the resiliency of the pin material, e.g. phosphor bronze, beryllium copper. Preferably, the pin sockets are freed by counter rotation through an arc sufficient to free the sockets from pins, e.g. 35° to 50°, before retraction of the alignment head.

It is an object of the present invention, therefore, to provide pin alignment apparatus having the foregoing features and advantages.

Another object of the invention is the provision of improved method and arrangement for pin alignment.

A further object is to provide improved alignment of terminal pins of a panel board for electronic equipment.

Still another object is to provide for automatic alignment of pins disposed in an array.

Another object is the provision of concurrent alignment of pins of an array in groups.

Other objects and features of the invention will become apparent to those skilled in the art as the disclosure is made in the following detailed description of a preferred embodiment of the invention.

DESCRIPTION OF THE PREFERRED EMBODIMENT

Figure 1:
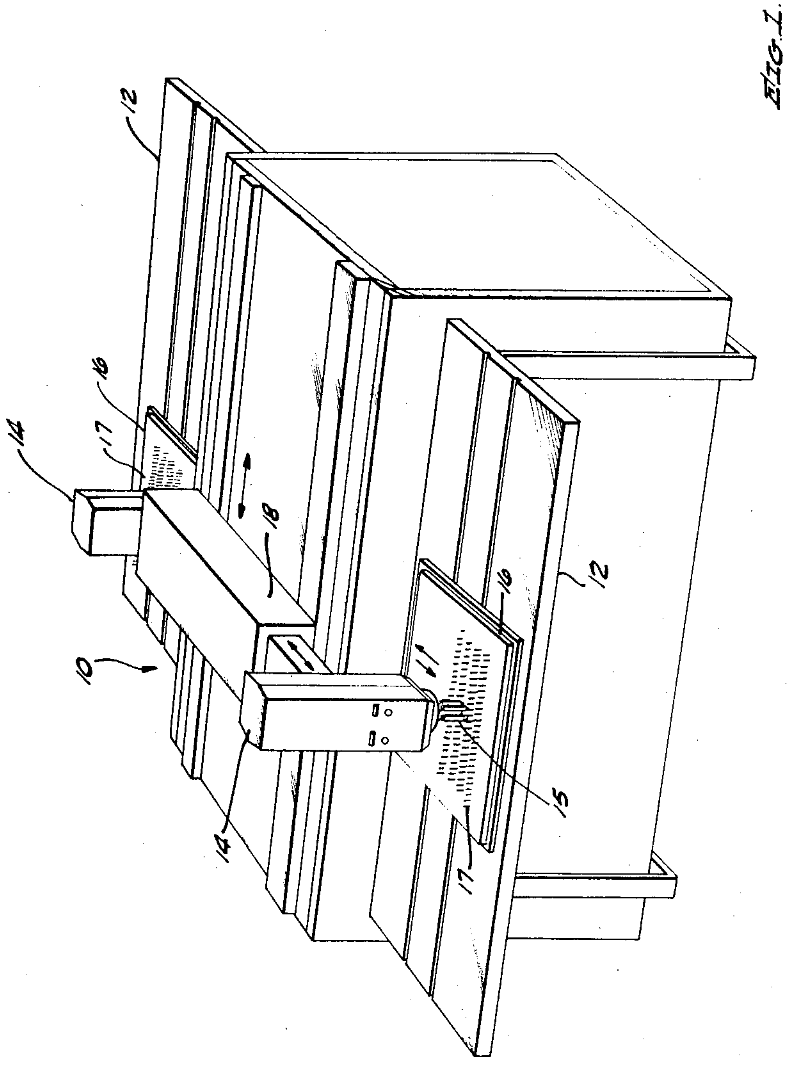
FIG. 1 is a perspective view of the pin alignment apparatus of the present invention.

Referring to FIG. 1, a numerically controlled positioning system 10 is shown for sequentially positioning and controlling pin alignment heads 14 for alignment of arrays of terminal pins 17 projecting upwardly out of panel boards 16. Panel boards 16 are mounted on work tables 12 by suitable fixtures which provide for placing the panel boards uniformly on the tables 12 for pin alignment operations by the alignment head 14. Pin alignment heads 14 are mounted on opposite ends of head positioning boom 18 which moves the alignment heads 14 in incremental steps along X and Y axes to sequentially locate and align groups of terminal pins 17 projecting upwardly from the panel board 16. In addition to providing point-to-point direction control of movement of the pin alignment heads 14, the numerically controlled system 10 is responsive to signals supplied by switches S1, S2 and S3 on the pin alignment head 14, which signals indicate completion of certain phases of the alignment operations cycle including retraction of the alignment heads 14 and completion of an alignment operations cycle for enabling sequential positioning of the heads 14.

Figures 2, 2A:
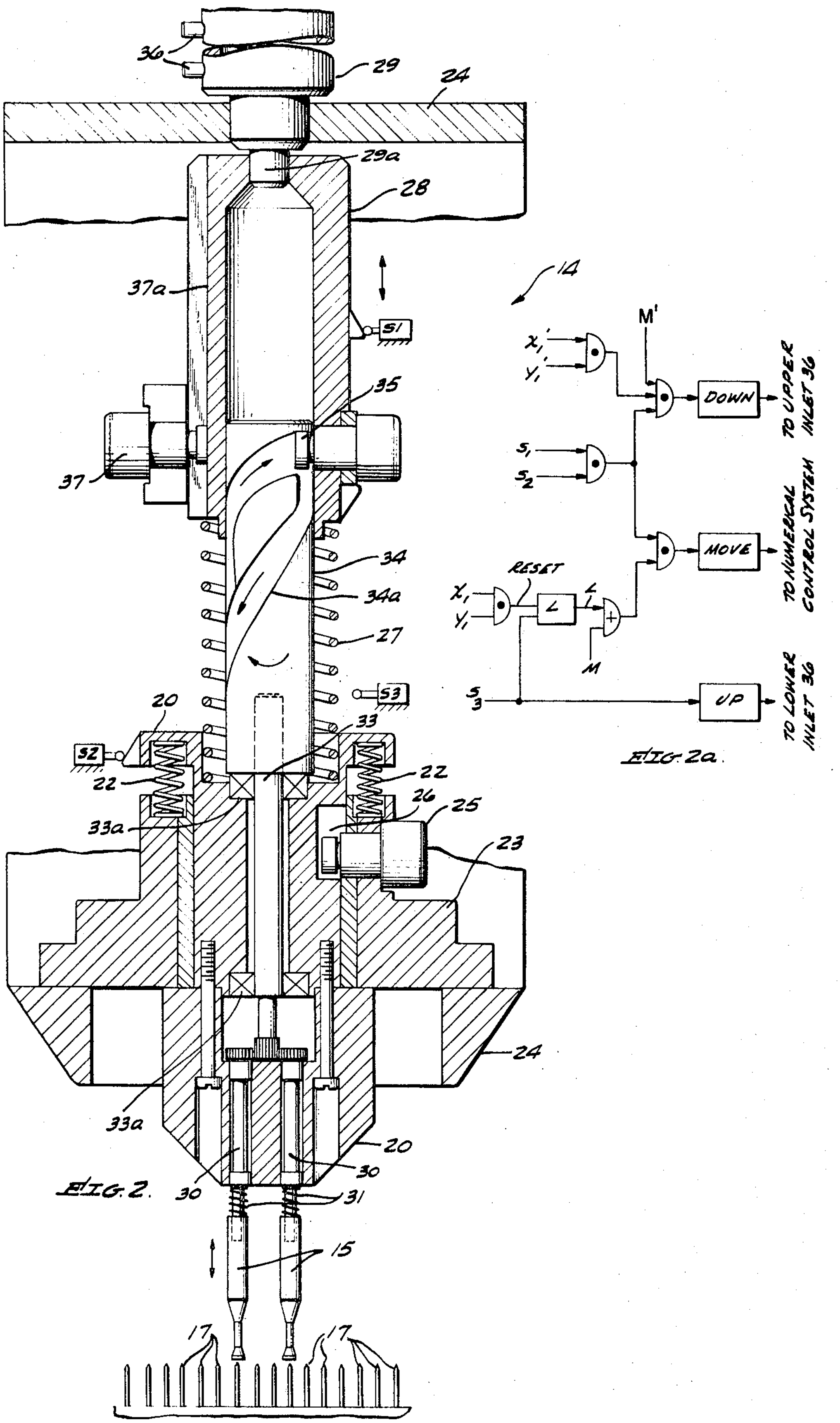
FIG. 2 is a view, partially in section, which shows the structural details for operation of the preferred embodiment of a typical one of the pin alignment head assemblies of the present invention.
FIG. 2*a* is a logic schematic diagram for control of the alignment head of FIG. 2.

In FIG. 2, a typical one of the pin alignment heads 14 is shown positioned above a group of terminal pins 17 in the panel board 16 by positioning boom 18. Of the group of four pin sockets 15, two of the four sockets are shown to be in coaxial alignment with corresponding terminal pins 17 of the selected group. Thus positioned, the head 14 is actuated to lower the pin sockets 15, thereby seating end portions of pin sockets 15 on the upper ends of the respective terminal pins 17 of the selected group. The seating phase is followed by an alignment and setting phase in which the pin sockets 15 are rotated to produce a set to the pin alignment by twisting the pins 17 of the selected group beyond their elastic limit. After the alignment of the pins 17 of the selected group is set by twisting of the pins 17, pin sockets 15 are allowed to rotate in the opposite direction to relieve the counter torque produced by the resiliency of the pins 17 and free the sockets 15 from frictional engagement with the pins, whereupon the head 14 is retracted to raise the pin sockets above the level of the array for positioning the head to the next group of terminal pins 17. The other alignment head 14 on boom 18 is operated concurrently.

The structure of the alignment heads 14 which provides the operational movements for pin alignment, as shown in FIG. 2, includes a cylindrical spindle housing 20*a* including upper section 20 which is constrained for rectilinear movement within a cylindrical guide member 23, and resiliently suspended therein by at least three annularly spaced helical springs 22 which are retained in opposing seats, as shown, by compression loading applied axially to housing 20 by a main spring 27. An annular lower flange of cylindrical member 23 is supported on a surrounding frame 24 which is fastened to the head positioning boom 18, shown in FIG. 1. The vertical travel of the spindle housing 20 is accurately determined by the spacing between opposing annular surfaces adjacent the seats for springs 22 and the spindle housing travel is constrained for rectilinear movement by a guide pin 25 projecting into a narrow channel 26.

Springs 22 are compressed to lower spindle housing 20 and pin sockets 15 during the seating phase of the alignment head 14 by added compression loading of the helical spring 27 having its lower end seated internally within the upper end of the spindle housing 20 as shown. The upper end of the helical spring 27 seats in an annular recess near the lower end of cylindrical connecting rod 28. Connecting rod 28, including push rod 29*a*, is attached to a piston in pneumatic actuator 29. When the added compression loading of main spring 27, during downward movement of rod 28, exceeds the combined resiliency of springs 22, the springs 22 are compressed to lower spindle housing 20*a*, spindles 30 and pin sockets 15 attached thereto, a total distance equal to the spacing between these members. Pin sockets 15 are slidably mounted on respective spindles 30 which are rotatably driven by a common pinion shaft 33 that is disposed concentrically in the upper part of housing 20 and secured in the lower end of cylindrical cam 34. Thus, cam raceway 34*a* controls the rotation of pin sockets 15 and the configuration of this raceway predetermines the interval of rotation to follow the vertical travel and seating of the pins 17 in sockets 15. Pin sockets 15 are slidably mounted on the ends of spindles 30 to provide for upward deflection thereof against the bias of small, helical springs 31 disposed on spindles 30. Rotation of the pin sockets 15 on spindles 30 is inhibited by pins 30*a* passing through spindle 30, as shown in the detail view of FIG. 4, while upward deflection against the bias of springs 31 is provided for by longitudinal slots 30*b* in the upper ends of the pin sockets 15. This flexibility permits the pin sockets 15 to be deflected upwardly by terminal pins 17 individually without bending or otherwise damaging these pins during seating. Thus, whenever the alignment of the socket ends and terminal pins is such that the terminal pins will not permit seating during lowering of the sockets 15, without bending or otherwise damaging a pin or pins 17, the pin sockets 15 are deflected upwardly against the spring bias to prevent damaging the pins 17 and provide for deferred seating for twisted pins 17.

As noted earlier, actuation of the alignment head 14 through the alignment operations is provided for by pneumatically operated actuator 29 coupled to the cylindrical cam 34 by connecting rod 28. A cam follower pin 35 projects into the cam raceway 34*a* to cause rotation of the cam and the pinion shaft during separate predetermined intervals of each cycle of reciprocating motion of the rod 28. These intervals are predetermined by the circumferential component of a cam raceway 34*a* and are indicated in the displacement diagram of FIG. 3. Reciprocal motion of the connecting rod 28 is produced by the pneumatic actuator 29 having a piston (not shown) which is driven by air pressure alternately supplied at inlets 36 and timed to initiate an alignment cycle only after the heads 14 have been properly positioned. Rectilinear movement of the rod 28 is assured by the inner end of follower pin 37 projecting into a longitudinal groove 37*a* in the side of rod 28. A small portion of this rectilinear motion is transmitted to lower spindle housing 20 and pin sockets 15, during the seating phase of the alignment operations cycle, when the compression loading of the main spring 27 exceeds the bias of springs 22.

After seating the ends of the pins 17 in a corresponding group of pin sockets 15 during the seating phase, the curvature in the cam raceway 34*a* causes rotation of the cylindrical cam 34 and this rotation is transmitted to the group of pin sockets 15 by pinion shaft 33 and spindles 30 as indicated by the coupling shown in the lower half of the spindle housing 20. During the return stroke of rod 28, the return path of raceway 34*a* is followed by the cam follower 35 to provide for restoring the alignment head for the next alignment cycle on the next group of pins 17.

The operation of the pin alignment head, shown in FIG. 2, is now described with reference to the displacement diagram of FIG. 3. After the head has been positioned to coaxially align the group of four pin sockets above respective ones of the selected group of four terminal pins 17, which are to be aligned, the head 14 is actuated into the pin operations cycle including the seating phase, pin set and alignment phase and a return phase including an interim period of the return phase in which the rotation is reversed before retraction thereof in order to free the sockets from friction produced by the counter torque produced by the resiliency of the pin material. In the displacement diagram of FIG. 3, the path and direction of the cam follower 35 in the cam raceway 34*a* is indicated by the arrows along path A to D for down travel and return travel from D to A including a broad range of travel in the triangular area defined by the points D, E and F. The actuator travel is indicated alongside the displacement diagram and comprises a rectilinear travel A–D. During an initial period of down travel of rod 28, in which the cam follower 35 travels from point A to point B, the large helical spring 27 is compression loaded and at point B, the force transmitted to the group of small springs 22 is sufficient to cause a spindle housing 20 to be moved down against the net spring bias of the small springs 22. In FIG. 3, beginning with the movement of the spindle housing 20 at point B, the seating phase includes the down travel of pin sockets 15 between points B and C on the path of the cam follower 35. At point C therefore, pins 17 of the selected group are seated in the end portion of pin sockets 15 unless one or more sockets are deflected by a circumferentially misaligned pin. As the cam follower traverses the path between points C and D, spindles 30 are rotatably driven by cam 34 and pinion shaft 33 to rotate sockets 15 in order to set the alignment thereof by exceeding the elastic limit of 35°–50° of the pin material. The total rotation is approximately 180° which assures the application of the permanent set to the pins 17 including those pins in which the seating is deferred until after the initial period of rotation of approximately 45°. It should be noted that during the elapsed time period between points C and D, there is no vertical travel of pin sockets 15 unless one or more of the pin sockets is unable to seat on the end of a circumferentially misaligned pin in which case the pin socket 15 is deflected by sliding along the spindle 30 against the bias of the spring 31 to the extent necessary to seat in the internal bore in the end of the pin socket 15. In most instances, except for circumferentially misaligned pins, i.e. twisted prior to alignment thereof, all of the pins of the selected group should be seated in the internal bore of the sockets during the seating phase. Accordingly, the spring bias exerted on the pin sockets 15, by the springs 31, is sufficient to prevent deflection of the sockets 15 during guidance of the end of the laterally misaligned pins 17 such as indicated in dashed lines in FIG. 4, for example.

Figure 3A:
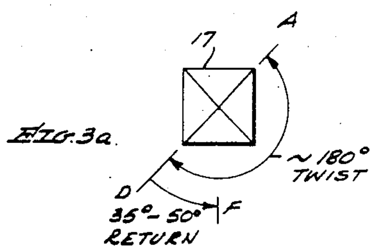
FIG. 3*a* is a top view of a terminal pin with accompanying indications of typical pin twisting and resilient return during alignment operations cycle.
Figure 3:
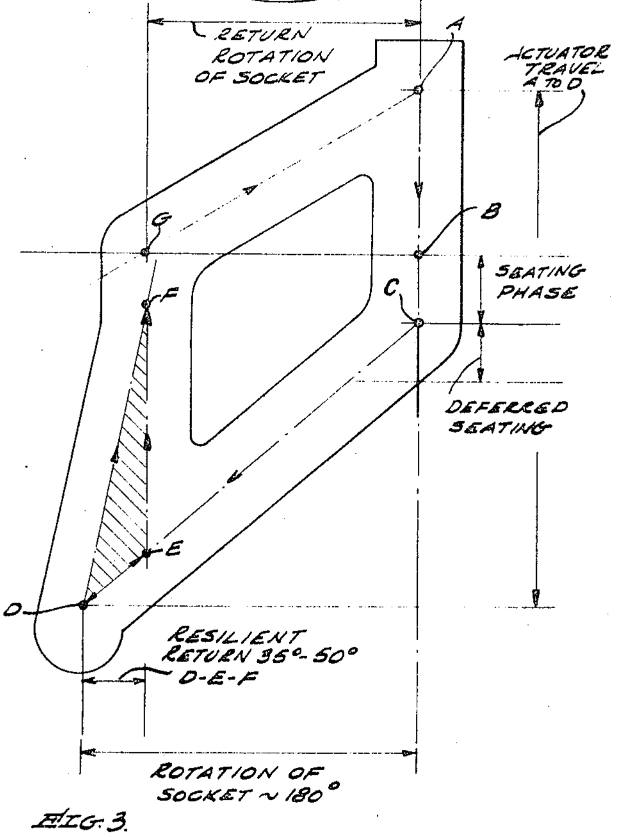
FIG. 3 is a displacement diagram of the main operating cam in the alignment head for illustrating the axial and rotational movement of the pin sockets in the several phases of group pin alignment in the operations cycle.

Twisting of the pins 17 beyond their elastic limit, i.e. to approximately 180°, is indicated in FIG. 3*a* including the 35° to 50° return of the pins 17 due to the retained resiliency thereof. Thus the selected group pins 17 will be set in stable alignment at point G along the path of cam follower 35 as indicated by the displacement diagram in FIG. 3. In FIG. 4*a*, a cross section of socket 15, the position of one of the pins 17 and the corresponding socket 15 during twisting has been indicated by dash lines. The skew of the pin during twisting results from the slightly larger internal bore of the socket relative to the size of pin 17 which results in a certain degree of lost motion during the rotation of the pin socket 15. This accounts in part for the extent of rotation of the sockets to provide the degree of twisting required for exceeding the elastic limit of the pin 17.

In the remainder of the return phase in the cycle of operations, the rectilinear travel of the pin sockets 15 is completed at point G as shown in the displacement diagram of FIG. 3. From point G to point A, pin sockets 15 are rotated back to the start position and are prepared for the next alignment operations cycle on a subsequent group of pins. Indication of completion of the operations cycle is provided by cam operated switches S1 and S3 operated by cam surfaces on the side of rod 28 and switch S2 by cam surface on upper spindle housing 20, shown in FIG. 2.

In response to the indication of the completion of the operations cycle, the control system is made operative to position the alignment head 14 for alignment of the next group of pins in the predetermined sequence. While the pneumatic actuator 29 can be operated simply by providing for a continuous reciprocal motion of the rod 28, operation can be interrupted by inhibiting the return stroke of the piston thereof, for example by an indication of a failure of the spindle housing to be moved down during the seating phase at the end of the down stroke of the rod 28. The output of switch S3, for example, can be utilized to enable return of the actuator piston by controlling the operation of the inlet 36 at the bottom of the actuator 29.

Referring to FIG. 2*a*, the schematic diagram illustrates logic control for operation of alignment head 14 through an alignment operations cycle and after completion thereof, for repositioning to the next group of pins of the array in accordance with the sequence programmed on the tape of the numerical control system for the X–Y positioning system 10. The logic control shown by the schematic diagram of FIG. 2*a* provides for operation of DOWN and UP solenoids provided for lower and upper inlets 36 of actuator 29 to produce reciprocating motion of the connecting rod 28. Also, this control logic supplies an output to the numerical control from a MOVE block to move the control tape in the numerical control system to read the next X–Y address and initiate repositioning of the head 14 to the group of pins specified by the address. In turn, the numerical control system supplies signals $X_1$ and $Y_1$ during repositioning movements to an address, read from a tape, and supplies signals $X_1'$ and $Y_1'$ when the movement is completed and the head 14 is stationary. Signals M and M′ are supplied by an override switch of the machine which inhibits operations cycles of the head 14 during certain positioning movements of the system.

Conventional symbols have been used for AND gates and an OR gate. The operations cycle of the head 14 is initiated by operation of the DOWN solenoid to supply pressure to upper inlet 36 and exhausting of air at lower inlet 36 of actuator 29 to move connecting rod 28 through the down stroke. DOWN solenoid is energized by the presence of outputs M′, $X_1$′, $Y_1$′, $S_1$ and $S_2$ applied to the AND gates as shown. Output M′ indicates no override, outputs $X_1$′ and $Y_1$′ indicate positioning of head 14 is completed, and $S_1$ and $S_2$ of switches S1 and S2 indicate connecting rod 28 and spindle housing 20 and pin sockets are in an up position for starting an alignment operations cycle. The return phase of the cycle for upward movement of the head is provided by output $S_3$ of switch S3 which energizes the UP solenoid for controlling the supply of pressure to lower inlet 36 and exhausting at the upper inlet of actuator 29. These solenoids in combination with the operation of actuator 29 provide for completion of the respective strokes for reciprocating movement and do not depend upon the presence of signal outputs from switches S1 to S3 after initiation of down or up strokes.

The completion of the head operations cycle is indicated by the presence of outputs $S_1$, $S_2$ and L (storage of output $S_3$). These outputs are gated to the MOVE block to enable repositioning of the head 14 by the control system. Move signals are required from both heads 14 supported on the boom 18 (FIG. 1) unless one head is not operative. Latch L, a resettable storage circuit or flip flop, is set by output $S_3$ which is stored until reset of L during repositioning by outputs $X_1$ and $Y_1$. Outputs $X_1$ and $Y_1$ are supplied during repositioning movements of the system 10. Output M is supplied during override operation to the OR gate and provides for positioning movements of the system 10 without operating the alignment heads 14.

Complete alignment to within 0.006 inch of all the terminal pins in a panel board 16, shown in FIG. 1, is provided for in a relatively short time by sequential positioning of the alignment head and group of sockets 15 over corresponding terminal pins 17 of the board 16. In a typical panel board 16, the terminal pins 17 are disposed in array comprising a series of terminal strips, each strip consisting of two parallel rows of closely spaced terminal pins 0.025 inch square projecting approximately 0.5 inch above the board. In the preferred embodiment of the present invention, pin sockets 15 are spaced to simultaneously operate on terminal pins in alternate rows of different terminal strips, and due to the close spacing of pins in each row, alternate pins in a row are selected by incremental positioning of a distance equal to the spacing between alternate pins in a row. For example, spacing of 0.3 inch between pin sockets 15 of the head 14 and increments of travel along the row of 0.2 inch will provide for alignment of pins spaced 0.1 inch apart along the row.

Figure 4:
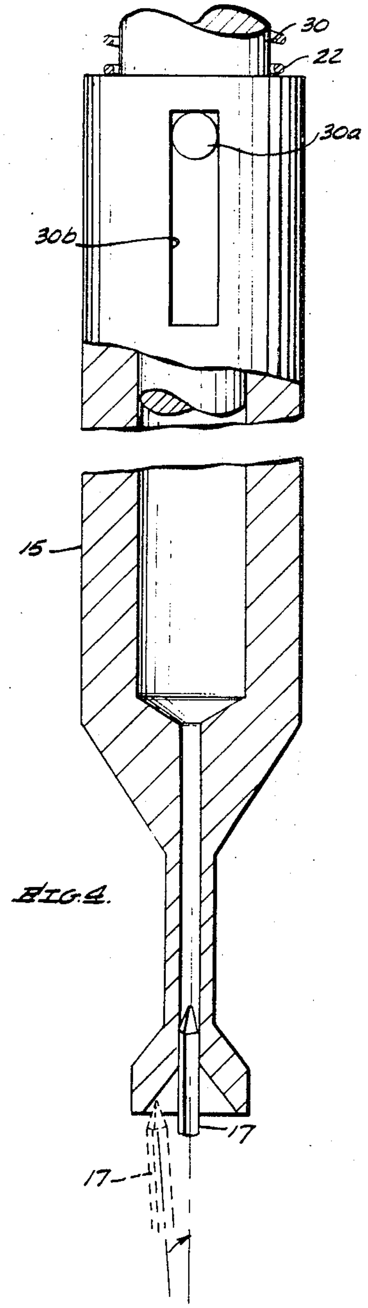
FIGS. 4 and 4*a* are detail views of a typical one of the pin sockets seated on a terminal pin for alignment thereof and illustrating lateral deflection and seating of a laterally misaligned terminal pin during the seating phase of a pin alignment operations cycle.
Figure 4A:
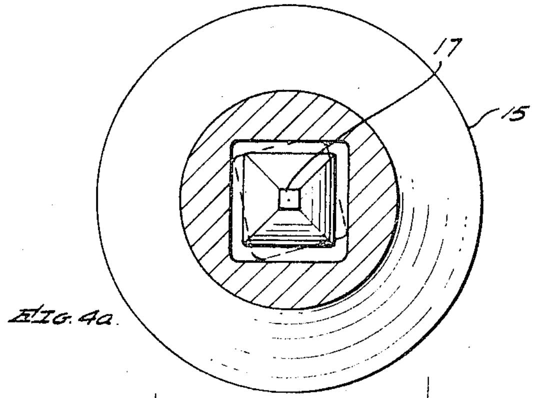

Referring to FIG. 4 for a more detailed discussion of the pin seating phase of the operations cycle, a misaligned pin 17 (shown in dashed lines) is deflected by the tapered end of socket 15 to seat in the internal bore of the pin socket 15. During the downward travel of socket 15, the tapered open end section of the socket engages the laterally misaligned pin 17 to be deflected into the internal bore as indicated by the arrows in FIG. 4. At the end of the seating phase, the pin will be seated, e.g. 0.060 inch, in the internal bore of the socket 15, as shown by pin 17 in solid lines. The spread of the tapered end portion of socket 15 is determined by the closeness of spacing of pins, e.g. 0.10 inch, in a row on a panel board 16. On the basis of statistics of lateral misalignment of pins 17, it has been found that spread of the tapered end of socket 15, e.g. 0.125 inch I.D., can extend beyond one half the distance between adjacent pins in a row (e.g. greater than 0.05 inch) while retaining the ability to seat only the coaxially disposed pin 17 for seating while deflecting any adjacent misaligned pin 17 which would extend within the area overlapped by the tapering spread of the socket.

Figure 5A:
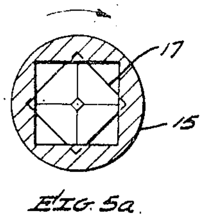
FIGS. 5 and 5*a* are views, partially in section, to provide a typical illustration of seating on a pin which is circumferentially misaligned.
Figure 5:
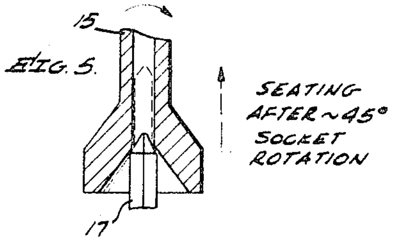

In the prior description, it is noted that the pin sockets 15 are slidably disposed on spindle 30 and movable upwardly against the bias exerted by springs 31 as shown in FIG. 3. Also, as noted in FIG. 3, to the right of the displacement diagram and below the seating phase, provision has been made for deferred seating as indicated by the arrow and dashed lines. Deferred seating occurs primarily when the pin to be aligned of the selected group is twisted; for example, when a panel board 16 is being processed for a second time for pin alignment as a result of damage or deformation of pins during handling prior to automatic wrapping of wires. In FIGS. 5 and 5*a*, deferred seating is illustrated for a typical twisted pin 17. The sectional view of FIG. 5*a* shows the pin 17 to be twisted approximately 45° relative to the internal bore of the pin socket 15. During the seating phase, when the socket 15 is lowered coaxially over the twisted pin 17, the socket is deflected upwardly compressing spring 31, shown in FIG. 2. The amount of upward deflection of the pin socket 15 is equal to the remainder of travel necessary to seat on the pin 17. Since the pin socket 15 is rotated approximately 180° between points C and D, the socket will seat early in the travel between these points, i.e. upon rotation of slightly less than 45° when the internal bore of the pin socket 15 becomes aligned with the twisted pin 17. Upon seating with rotation, as indicated by the dashed arrow in FIG. 5, pin 17 is then twisted beyond its elastic limit, i.e. beyond 40° to 45° in the remaining rotation of approximately 140° to 135°, to provide a permanent set in alignment after the removal of torque applied by the pin socket 15.

While a preferred embodiment of the invention has been specifically disclosed, it should be clear that the present invention is not limited thereto as many variations will be readily apparent to those skilled in the art. In this regard, it should be noted that the preferred embodiment illustrates a preferred structural arrangement capable of automatically processing the terminal pins 17 in an array as found on a panel board 16 for mounting printed circuit boards. Accordingly, in combination with a control system for automatically positioning the pin alignment heads 14 over respective groups of terminal pins 17 for sequential processing of the terminal pins for alignment, the pin alignment heads 14 are capable of producing the desired alignment of all the pins 17 on the panel boards 16. After the pin alignment heads have been positioned, the control system need only initiate reciprocal operation of the head and have an indication of the completion of the operations cycle to provide for sequential positioning of the heads. Preferably, the pin alignment heads 14 include switches such as S1, S2 and S3 to sense malfuctions of the head as well as proper completion of the alignment operations cycle in order to indicate successful or unsuccessful alignments of the respective group of pins 17. After a pin alignment head 14 has been positioned over a group of pins 17, the operation of the socket provides for deflecting laterally misaligned pins to proper alignment and position applying a permanent set to the pins in the proper alignment and producing a uniform alignment of all the pins in the array on the terminal board.

As used herein, the term set or setting is used in its technical sense, i.e. the terminal pins 17 are twisted beyond their elastic limit. The elastic limit is the maximum stress within which deformation completely disappears after the removal of torque and no set remains. In order to produce a permanent alignment, the elastic limit of the material of the pin is exceeded to purposely produce a set. Further, the present invention provides for facilitating the removal of the pin sockets 15 from the pins after alignment by elimination of the torque produced by the elasticity retained by the pin. Counter rotation of the pin sockets 15, therefore, eliminates the torque exerted by pins 17 on the pin sockets 15 and accompanying friction between the opposing engaging surfaces of the end portions of the socket 15 and pin 17 to free the socket for retraction of the alignment head and sockets 15.

What is claimed is:

1. Apparatus for axial alignment of an elongated member secured in a base at one end thereof comprising:

a receptacle having a seat shaped for coaxial seating of the unsecured end portion of said elongated member in said receptacle to provide for axial twisting of said member along a substantial portion of its length;

means for supporting and positioning said receptacle along a desired axis of alignment of said member; and means for moving the receptacle to seat the unsecured end portion of said member and rotating said receptacle through an arc about the axis of said seat to produce axial twisting of said member beyond the elastic limit of the material of said member along its length and produce a seat in axial alignment of a substantial portion of said member along the axis of the receptacle seat, said receptacle being resiliently supported to be axially deflected to limit the force applied to a member engaged during axial movement of said receptacle for seating of the member.

2. A pin alignment head comprising:

a receptacle having an internal bore for receiving and seating the free end of a pin having its other end secured in a base;

means for supporting and positioning said receptacle axially for seating the free end of said pin in the bore, said bore having an inner periphery for engaging the free end of the pin for twisting thereof; and means for resiliently loading said receptacle to provide for axial deflection thereof by engagement with a pin not seating in the opening during axially positioning of the receptacle.

3. The pin alignment head according to claim 2 in which said alignment head comprises of a plurality of receptacles, each including an internal bore for seating the free ends of a corresponding plurality of pins for twisting of said pins.

4. The pin alignment head according to claim 2 in which said receptacle is disposed along a desired axis of alignment for said pin and comprises an elongated member having an internal bore for seating the free end of said pin to twist said pin and further includes means for rotating said receptacle along its longitudinal axis and through an arc for twisting said pin beyond the elastic limit of the pin material for setting the alignment of said pin.

5. The pin alignment head according to claim 2 in which the internal bore of said receptacle includes a tapered opening for receiving and deflecting the free end of said pin into said bore to be seated therein.

6. The pin alignment head according to claim 3 which further includes driving means coupled to each of said plurality receptacles for producing concurrent movement of said receptacles for seating the free ends of corresponding pins in said bores and producing concurrent rotation of said receptacles for axial twisting of corresponding seated pins beyond the elastic limit of the pin material along the lengths thereof for permanence in setting the alignment thereof.

7. Pin alignment apparatus comprising:

a pin alignment head comprising a plurality of pin sockets disposed in uniform axial alignment for inducing corresponding alignment of a group of pins;

means including automatic means for providing automatic coordinate movements of said head along coordinate row and column axes for selectively positioning said sockets along row and column axes for seating coaxially on the free ends of a selected group of pins in a row having opposite ends secured in a base for initiating alignment of the selected group of pins in a row and groups of pins in sequential alignment operations cycles and selectively positioning said group of sockets along the column axis for sequential alignment of pins in groups in subsequent rows; and said pin alignment head further comprising means for concurrently moving said sockets axially thereof to seat on the free ends of said pins of a coordinately selected group to provide for rotational engagement for twisting of the pins from the free ends thereof in a seating phase of each of said cycles and rotating said sockets after seating in an alignment phase of each of said cycles, said sockets being rotated through an arc to produce a relative twist along the length of said pins of the group beyond the elastic limit of the pin material whereby the pins of the group are straightened to be set to the uniform axial alignment of the respective sockets in the respective alignment cycle, said means for moving and rotating the pin sockets comprising actuating means supported for reciprocating and rotational movements along the same axes, said actuating means including, a reciprocating member driven axially to produce axial movements and a rotatable member drivingly coupled to each of said sockets and responsive to at least a predetermined portion of said axial movements to rotate said member and said sockets concurrently.

8. The pin alignment apparatus according to claim 7 in which said actuating means further includes a plurality of spindles for said sockets and a common pinion shaft coupling said rotatable member to said spindles to produce concurrent rotation of said sockets during the alignment phase of said cycle.

9. The pin alignment apparatus according to claim 8 in which said rotatable member comprises a cylindrical cam including means coupled to said reciprocating member to produce said rotation for twisting of said pins and providing for limited counter rotation to free the pin sockets prior to retraction thereof.

10. Pin alignment apparatus comprising:

a plurality of pin sockets disposed in uniform axial alignment for inducing corresponding alignment of a plurality of pins;

support means including means for positioning said sockets for seating coaxially on the free ends of said pins having opposite ends secured in a base for initiating an alignment operations cycle;

means for concurrently moving said sockets axially thereof to seat on the free ends of said pins to provide rotational engagement for twisting of the pins from the free ends thereof in a seating phase of said cycle and rotating said sockets after seating in an alignment phase of said cycle, said sockets being rotated through an arc to produce a relative twist along the length of said pins beyond the elastic limit of the pin material whereby the pins are straightened to be set to the uniform axial alignment of the respective sockets, said latter means including a plurality of spindles for said sockets and a reciprocating member driven axially to produce axial movements; and a spindle housing for supporting said spindles for axial and rotational movement and resilient means coupling said housing to said reciprocating member for producing axial movements of said pin sockets.

11. Pin alignment apparatus including a pin alignment head for axial alignment of an array of terminal pins uniformly spaced and projecting out of a panel board comprising:

a positioning system arrangement for positioning of said panel board relative to said alignment head for sequential alignment of groups of terminal pins in the array;

said alignment head comprising means including a group of pin sockets supported for axial and rotational movements and having seats disposed to provide the desired axial alignment for the terminal pins of said array, said group of pin sockets being rotated to provide the desired axial alignment of the group of pin sockets according to the uniform spacing between terminal pins of the particular array;

means for producing axial movement of said pin sockets for seating a corresponding group of terminal pins disposed approximately coaxially with the seat of said pin sockets;

means for concurrently rotating individual sockets of said group seated on the corresponding group of terminal pins, to twist said pins along the axial length thereof to produce a set in the alignment of the pins according to the alignment of the seats of respective pin sockets; and means for retracting said group of pin sockets including axial and rotational return movements for restoring the group of pin sockets to enable repositioning of the head and sockets for alignment of the next group of terminal pins in the array.

12. The pin alignment apparatus according to claim 11 in which said alignment head means includes automatic means for automatically positioning along both row and column coordinate axes of the array and cycling said head through an alignment operations cycle at each position for providing for a series of movements including said axial movement of said pin sockets for seating respective end portions of terminal pins of the coaxially disposed group, said rotating of individual pin sockets of said group through an arc to twist the seated group of pins to set the alignment thereof, and said movements for restoring the group of pin sockets.

13. Pin alignment apparatus including a pin alignment head for axial alignment of an array of terminal pins projecting out of a panel board comprising:

a positioning system arrangement for positioning of said panel board relative to said alignment head for sequential alignment of groups of terminal pins in the array;

said alignment head comprising means including a group of pin sockets supported for axial and rotational movements and having seats disposed to provide the desired axial alignment for the terminal pins of said array;

means for producing axial movement of said pin sockets for seating a corresponding group of terminal pins disposed approximately coaxially with the seat of said pin sockets;

means for concurrently rotating individual sockets of said group seated on the corresponding group of terminal pins to twist said pins along the axial length thereof to produce a set in the alignment of the pins according to the alignment of the seats of respective pin sockets; and means for retracting said group of pin sockets including axial and rotational return movements for restoring the group of pin sockets to enable repositioning of the head and sockets for alignment of the next group of terminal pins in the array;

the configuration of the terminal pins and pin sockets at opposing seating surfaces requires circumferential alignment of said pin sockets to seat on end portions of coaxially disposed pins, and said means for supporting the group of pin sockets includes means for resiliently biasing said sockets to provide for deferring of terminal pin seating until the pin sockets are circumferentially aligned during rotation for seating on said terminal pins.

14. The pin alignment apparatus according to claim 12 in which said automatic means includes means for reversing the rotation of the group of pin sockets through an arc sufficient to relieve the stress induced by twisting of said group of terminal pins in order to free the sockets of the group before retracting the pin sockets by axial movement to restore said sockets.

15. The pin alignment apparatus according to claim 12 in which said automatic means includes means for detecting completion of operations in the cycle and means for automatically repositioning of said alignment head to sequential groups of terminal pins along both row and column axes.

16. Pin alignment apparatus including a pin alignment head for axial alignment of an array of terminal pins projecting out of a panel board comprising:

a positioning system arrangement for positioning of said panel board relative to said alignment head for sequential alignment of groups of terminal pins in the array;

said alignment head comprising means including a group of pin sockets supported for axial and rotational movements and having seats disposed to provide the desired axial alignment for the terminal pins of said array;

means for producing axial movement of said pin sockets for seating a corresponding group of terminal pins disposed approximately coaxially with the seat of said pin sockets;

means for concurrently rotating individual sockets of said group seated on the corresponding group of terminal pins to twist said pins along the axial length thereof to produce a set in the alignment of the pins according to the alignment of the seats of respective pin sockets;

means for retracting said group of pin sockets including axial and rotational return movements for restoring the group of pin sockets to enable repositioning of the head and sockets for alignment of the next group of terminal pins in the array;

said alignment head means includes automatic means for automatically positioning along both X and Y axes of the array and cycling said head through an alignment operations cycle at each position for providing for a series of movements including said axial movement of said pin sockets for seating respective end portions of terminal pins of the coaxially disposed group, said rotating of individual pin sockets of said group through an arc to twist the seated group of pins to set the alignment thereof, and said movements for restoring the group of pin sockets wherein said automatic means includes means for reversing the rotation of the group of pin sockets through an arc sufficient to relieve the stress induced by twisting of said group of terminal pins in order to free the sockets of the group before retracting the pin sockets by axial movement to restore said sockets; and means for producing a sequence including retraction of said pin sockets axially before completing the reverse rotation of the pin sockets to their initial circumferential position at the beginning of the operations cycle.

17. Pin alignment apparatus for straightening of elongated members formed of material having an elastic limit and secured in a base at one end thereof, comprising:

a receptacle having opening for receiving and engaging the unsecured end of an elongated member for seating in said opening;

means for supporting and positioning said receptacle along the desired axis of alignment of the elongated member relative to other members, said receptacle being resiliently supported to be biased toward said member for axial deflection by said member in order to limit axial force applied to a member engaged during axial seating movements of said receptacle; and means for moving the receptacle for seating the unsecured end portion of said member and for rotating the receptacle through an arc about the desired axis to produce axial, relative twisting of the material of the member beyond its elastic limit along a substantial portion of its length between the seated and secured ends thereof so that a permanent set is induced in the material along the length of the member for retaining the straightening of the member along a substantial portion of its length and for producing the desired axial alignment of the member.

18. The method of straightening pins disposed in rows and columns of a planar array and secured at one end in a base comprising:

providing a small group of rotatable drive members having end portions for seating the unsecured end portions of a corresponding group of pins consisting of a minor portion of the pins in the rows and columns in order to apply an axial twisting force to the pins of the group;

automatically positioning said group of drive members a plurality of times along one coordinate axis of the planar array to sequentially straighten pins in at least one row;

automatically positioning said group of drive members a plurality of times along the other coordinate axis of the array after completion of a plurality of operation cycles straightening pins in at least one row for sequentially straightening the pins of the array by minor groups wherein said sequential positioning locates said group of drive members to seat the unsecured end portions of the corresponding group of pins for applying the axial twisting force about a desired axis of alignment for straightening the pins of the respective group; and rotating said drive members of the group through an arc about the desired axis of alignment to engage the pins of the corresponding group to produce relative twisting of the pin material beyond its elastic limit along the length of the pin to straighten the pin along the length thereof and along the desired axis of alignment, the group of drive members being resiliently loaded for axial deflection for delayed seating on the unsecured end portions.

19. The method of straightening pins disposed in rows and columns of a planar array and secured at one end in a base comprising:

providing a small group of rotatable drive members having end portions for seating the unsecured end portions of a corresponding group of pins consisting of a minor portion of the pins in the rows and columns in order to apply an axial twisting force to the pins of the group;

automatically positioning said group of drive members a plurality of times along one coordinate axis of the planar array to sequentially straighten pins in at least one row;

automatically positioning said group of drive members a plurality of times along the other coordinate axis of the array after completion of a plurality of operation cycles straightening pins in at least one row for sequentially straightening the pins of the array by minor groups wherein said sequential positioning locates said group of drive members to seat the unsecured end portions of the corresponding group of pins for applying the axial twisting force about a desired axis of alignment for straightening the pins of the respective group;

rotating said drive members of the group through an arc about the desired axis of alignment to engage the pins of the corresponding group to produce relative twisting of the pin material beyond its elastic limit along the length of the pin to straighten the pin along the length thereof and along the desired axis of alignment, the drive members of the group having configurations corresponding in cross section to the cross section of the pin transmitting the twisting force to the unsecured end of pin, positioning the group axially to seat only the unsecured end portions of the corresponding group of pins and applying twisting force along the length of the pins; and the drive members are resiliently loaded for deflection for delayed seating of the unsecured end portions of the pins during rotation when the cross section configuration of the seats of the drive members are substantially aligned with the cross sections of the unsecured end portion of the corresponding pin.

20. The method of claim 19 in which the drive members are moved axially to unseat the pin and the twisting force applied to the pin by the drive members is removed prior to axial movement of the drive members to remove counter torque and friction between the drive members and pin.

* * * * *